US012682631B2

(12) United States Patent
Ferzli et al.

(10) Patent No.: US 12,682,631 B2
(45) Date of Patent: Jul. 14, 2026

(54) AUTONOMOUS AGENT TASK PRIORITY SCHEDULING

(71) Applicant: Intel Corporation, Santa Clara, CA (US)

(72) Inventors: Rony Ferzli, Chandler, AZ (US); Rita Chattopadhyay, Chandler, AZ (US); Mehrnaz Khodam Hazrati, San Jose, AZ (US); Hassnaa Moustafa, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/854,820

(22) Filed: Jun. 30, 2022

(65) Prior Publication Data

US 2022/0335714 A1      Oct. 20, 2022

(51) Int. Cl.
| | |
|---|---|
| *G06V 10/00* | (2022.01) |
| *G05B 19/4155* | (2006.01) |
| *G06T 7/66* | (2017.01) |
| *G06T 7/73* | (2017.01) |
| *G06V 10/26* | (2022.01) |
| *G06V 10/764* | (2022.01) |
| *G06V 10/96* | (2022.01) |
| *G06V 20/64* | (2022.01) |

(52) U.S. Cl.
CPC ......... *G06V 10/96* (2022.01); *G05B 19/4155* (2013.01); *G06T 7/66* (2017.01); *G06T 7/73* (2017.01); *G06V 10/26* (2022.01); *G06V 10/764* (2022.01); *G06V 20/64* (2022.01); *G05B 2219/39167* (2013.01); *G06T 2207/10028* (2013.01)

(58) Field of Classification Search
CPC ...... G06V 10/96; G06V 10/26; G06V 10/764; G06V 20/64; G06V 20/10; G06V 20/58; G05B 19/4155; G05B 2219/39167; G05B 2219/32252; G05B 19/41865; G06T 7/66; G06T 7/73; G06T 2207/10028
See application file for complete search history.

(56) References Cited

U.S. PATENT DOCUMENTS

| | | | |
|---|---|---|---|
| 2002/0165638 A1* | 11/2002 | Bancroft | ................. G07F 17/16 |
| | | | 700/245 |
| 2012/0185094 A1* | 7/2012 | Rosenstein | .............. B25J 5/007 |
| | | | 901/1 |
| 2018/0376305 A1* | 12/2018 | Ramalho de Oliveira | .................. |
| | | | H04W 4/44 |

(Continued)

FOREIGN PATENT DOCUMENTS

WO      WO-2020205655 A1 *  10/2020    ............. G06N 20/00

OTHER PUBLICATIONS

Caprarescu et al., A Self-Organizing Feedback Loop for Autonomic Computing, 2009 Computation World: Future Computing, Service Computation, Cognitive, Adaptive, Content, Patterns (Year: 2009).*

*Primary Examiner* — Xiao Liu

(74) *Attorney, Agent, or Firm* — Banner & Witcoff, Ltd.

(57) ABSTRACT

Task priority scheduling and resource allocation of autonomous agents are described. The scheduling may utilize sensor data characteristics to facilitate scheduling decisions. Also described is the refinement of task priority scheduling utilizing fleet management information-based scene and environment information, such as by using information available to the fleet management controller.

25 Claims, 8 Drawing Sheets

(56)　　　　References Cited

U.S. PATENT DOCUMENTS

| | | | |
|---|---|---|---|
| 2022/0011120 A1* | 1/2022 | St. Romain | G08G 1/096741 |
| 2022/0174229 A1* | 6/2022 | Cardei | G06V 10/22 |
| 2022/0197355 A1* | 6/2022 | Choi | G06F 1/206 |

* cited by examiner

200

Processing Circuitry 202

Sensor(s) 204

Transceiver 206

Input/Output Interface 208

Drive 209

Memory 210 manipulator 211

300

Processing Circuitry 302

Sensor(s) 304

Transceiver 306

Memory 310

500

AUTONOMOUS AGENT TASK PRIORITY SCHEDULING

TECHNICAL FIELD

The disclosure generally relates to task priority scheduling for autonomous systems, including task priority scheduling using sensor data.

BACKGROUND

Autonomous agents, such as Autonomous Mobile Robots (AMRs), can navigate an environment using one or more path planning methods. Autonomous agents commonly have limited processing resources and such resources are subject to prioritization. Kernels for the applications may set the priority of tasks for workloads, such as processing to navigate the within the environment and perform tasks of the agent, based on static rules for workload criticality. However, such systems fail to dynamically determine task priorities and do not consider sensor data in determining task scheduling, leading to inefficiencies in processing resource utilization.

BRIEF DESCRIPTION OF THE DRAWINGS/FIGURES

The accompanying drawings, which are incorporated herein and form a part of the specification, illustrate the present disclosure and, together with the description, and further serve to explain the principles of the disclosure and to enable a person skilled in the pertinent art to make and use the techniques discussed herein.

The present disclosure will be described with reference to the accompanying drawings. The drawing in which an element first appears is typically indicated by the leftmost digit(s) in the corresponding reference number.

DETAILED DESCRIPTION

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

The present disclosure provides an advantageous solution for task priority scheduling and resource allocation that utilize sensor data characteristics to facilitate scheduling decisions. The present disclosure also provides refinement of task priority scheduling utilizing fleet management information-based scene and environment information, such as by using information available to the fleet management controller.

Autonomous agents, such as Autonomous Mobile Robots (AMRs), are increasing being adapted for use in factories, warehouses, hospitals, and other industrial and/or commercial environments. Autonomous mobile platforms implement perception and manipulation jointly to accomplish a given task by navigating an environment. Autonomous agents may use motion and path planning to navigate the environment that may be a partial or fully autonomous environment, or one that is generally free of autonomous agents (non-autonomous environments).

AMRs may communicate and coordinating with one other and/or with a central controller (e.g. controller 108) that may be configured for management of a fleet of autonomous agents. The disclosure is described with respect to centralized environments that utilize a central controller, but the teachings of the disclosure are also applicable to partial or fully decentralized environments.

The system may be configured to implement a centralized algorithm that generates collision-free trajectories for multiple cooperating AMRs in a shared, dynamic environment. Collision-free trajectories are generated, considering the obstacles detected by the AMR's sensors, the neighboring AMR's sensors, obstacles detected by one or more sensors within the environment, as well as the trajectories of neighboring AMRs themselves.

Figure 1:
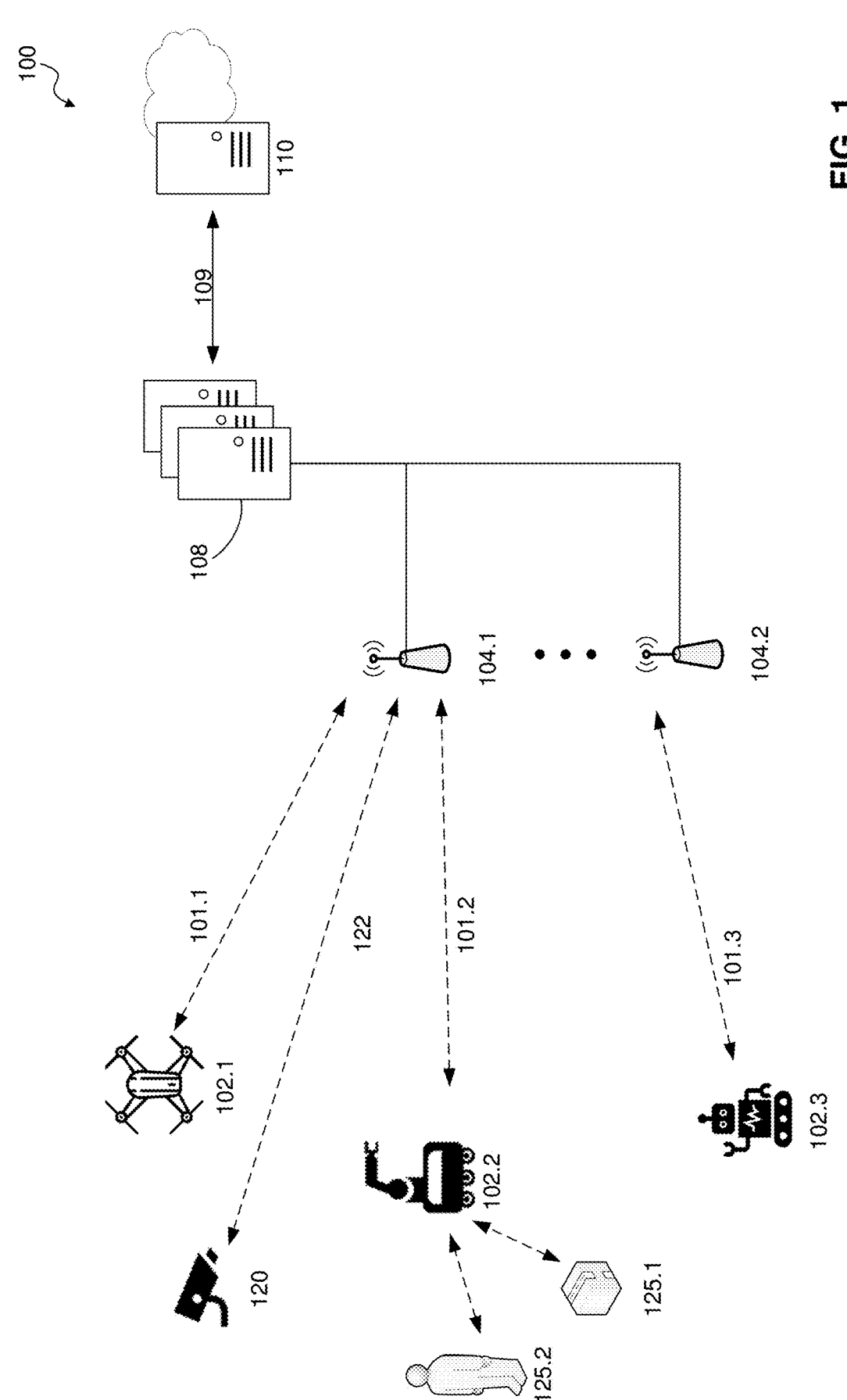
FIG. 1 illustrates a block diagram of an exemplary centralized environment utilizing AMRs, in accordance with the disclosure.

FIG. 1 illustrates an exemplary environment 100. The environment 100 may utilize autonomous mobile robots (AMRs) 102 in accordance with the disclosure. The environment 100 supports any suitable number of AMRs 102, with three AMRs 102.1-102.3 being shown for ease of explanation.

The environment 100 may be any suitable type of environment that may use AMRs 102, such as a factory, warehouse, hospital, office building, etc. The AMRs 102 may have any suitable type of design and function to communicate with other components of a network infrastructure as further disused below. The AMRs 102 may operate autonomously or semi-autonomously and be configured as mobile robots that move within the environment 100 to complete specific tasks. One or more of the AMRs 102 may alternatively be configured as a stationary robot having moveable components (e.g. moveable arms) to complete localized tasks.

The environment 100 may include one or more sensors 120 configured to monitor the locations and activities of the AMRs 102, humans, machines, other robots, or other objects (as would be understood by one of ordinary skill in the art) within the environment 100. The sensors 120 may include, for example, radar (radio detection and ranging), Light detection and ranging (LIDAR), optical sensors, Red-Green-Blue-Depth (RGBD) sensors, infrared sensors, cameras, audio sensors (e.g. microphones), or other sensors as would be understood by one or ordinary skill in the art. The sensors may communicate information (sensor data) with the computing device 108 (via access point(s) 104). Although not shown in FIG. 1 for purposes of brevity, the sensor(s) 120 may additionally communicate with one another and/or with one or more of the AMRs 102.

Although the disclosure includes examples of the environment 100 being a factory or warehouse supports AMRs 102 operating within such an environment, this is by way of example and not a limitation. The teachings of the disclosure may be implemented in accordance with any suitable type of environment and/or type of mobile agent. For instance, the environment 100 may be outdoors and be identified with a region such as a roadway that is utilized by autonomous vehicles. Thus, the teachings of the disclosure are applicable to AMRs as well as other types of autonomous agents that may operate in any suitable type of environment based upon any suitable application or desired function.

Figure 2:
FIG. 2 illustrates a block diagram of an exemplary AMR in accordance with the disclosure.
Figure 2:
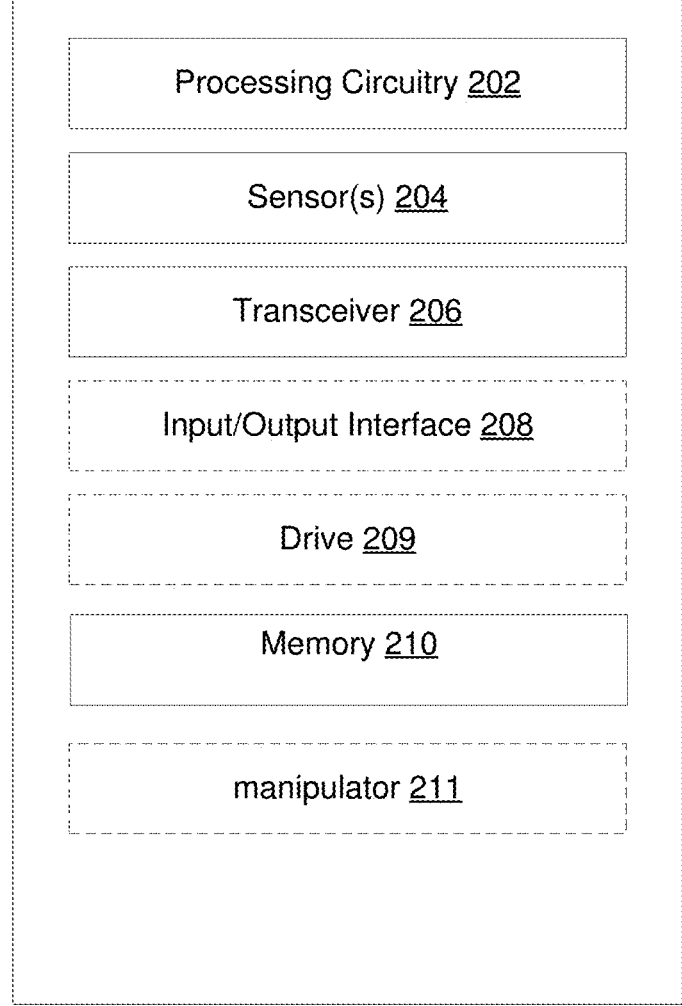

With reference to FIG. 2, the AMRs 102 may implement a suite of onboard sensors 204 to generate sensor data indicative of the location, position, velocity, heading orientation, etc. of the AMR 102. These sensors 204 may be implemented as any suitable number and/or type that are generally known and/or used for autonomous navigation and environmental monitoring. Examples of such sensors may include radar; LIDAR; optical sensors, such as Red-Green-Blue-Depth (RGBD) sensors; cameras; audio sensors (e.g. microphones), compasses; gyroscopes; positioning systems for localization; accelerometers; etc. Thus, the sensor data may indicate the presence of and/or range to various objects near each AMR 102. Each AMR 102 may additionally process this sensor data to identify obstacles or other relevant information within the environment 100. The AMR 102 may offload the processing of sensor and/or other data to one or more other computing devices within the environment 100 and/or in communication with the environment 100. For example, the AMR 102 may offload the processing of sensor and/or other data to the central controller 108 and/or to one or more other neighboring AMRs 102.

The AMRs 102 may use the sensor data to calculate (e.g. iteratively) respective navigation paths. The AMRs 102 may also have any suitable number and/or type of hardware and/or software configurations to facilitate autonomous navigation functions within the environment 100, including known configurations. For example, each AMR 102 may implement a controller that may comprise one or more processors or processing circuitry 202, which may execute software that is installed on a local memory 210 to perform various autonomous navigation-related functions.

The AMR 102 may use onboard sensors 204 to perform pose estimation and/or to identify e.g. a position, orientation, velocity, direction, and/or location of the AMR 102 within the environment 100 as the AMR 102 moves along a particular planned path. The processing circuitry 202 can execute a path planning algorithm stored in memory 210 to execute path planning and sampling functionalities for navigation-related functions (e.g. SLAM, octomap generation, multi-robot path planning, etc.) of the AMR 102.

The AMRs 102 may further be configured with any suitable number and/or type of wireless radio components to facilitate the transmission and/or reception of data. For example, the AMRs 102 may transmit data indicative of current tasks being executed, location, orientation, velocity, trajectory, heading, etc. within the environment 100 (via transceiver 206 as shown in FIG. 2). As another example, the AMRs 102 may receive commands and/or planned path information from the computing device 108, which each AMR 102 may execute to navigate to a specific location within the environment 100. Although not shown in FIG. 1 for purposes of brevity, the AMRs 102 may additionally communicate with one another to determine information (e.g. current tasks being executed, location, orientation, velocity, trajectory, heading, etc.) with respect to the other AMRs 102, as well as other information such as sensor data generated by other AMRs 102.

The AMRs 102 operate within the environment 100 by communicating with the various components of the supporting network infrastructure and/or communicating with one or more other AMRs 102. The network infrastructure may include any suitable number and/or type of components to support communications with the AMRs 102. For example, the network infrastructure may include any suitable combination of wired and/or wireless networking components that operate in accordance with any suitable number and/or type of communication protocols. For instance, the network infrastructure may include interconnections using wired links such as Ethernet or optical links, as well as wireless links such as Wi-Fi (e.g. 802.11 protocols) and cellular links (e.g. 3GPP standard protocols, LTE, 5G, etc.). The network infrastructure may be, for example, an access network, an edge network, a mobile edge computing (MEC) network, etc. In the example shown in FIG. 1, the network infrastructure includes one or more cloud servers 110 that enable a connection to the Internet, which may be implemented as any suitable number and/or type of cloud computing devices. The network infrastructure may additionally include a computing device 108, which may be implemented as any suitable number and/or type of computing device such as a server. The computing device 108 may be implemented as an Edge server and/or Edge computing device, but is not limited thereto. The computing device 108 and/or server 110 may also be referred to as a controller.

According to the disclosure, the computing device 108 may communicate with the one or more cloud servers 110 via one or more links 109, which may represent an aggregation of any suitable number and/or type of wired and/or wireless links as well as other network infrastructure components that are not shown in FIG. 1 for purposes of brevity. For instance, the link 109 may represent additional cellular network towers (e.g. one or more base stations, eNodeBs, relays, macrocells, femtocells, etc.). According to the disclosure, the network infrastructure may further include one or more access points (APs) 104. The APs 104 may be implemented in accordance with any suitable number and/or type of APs configured to facilitate communications in accordance with any suitable type of communication protocols. The APs 104 may be configured to support communications in accordance with any suitable number and/or type of communication protocols, such as an Institute of Electrical and Electronics Engineers (IEEE) 802.11 Working Group Standards. Additionally, or alternatively, the APs 104 may operate in accordance with other types of communication standards other than the 802.11 Working Group, such as cellular based standards (e.g. "private cellular networks) or other local wireless network systems, for instance. Additionally, or alternatively, the AMRs 102 may communicate directly with the computing device 108 or other suitable components of the network infrastructure without the need to use the APs 104. Additionally, or alternatively, one or more of AMRs 102 may communicate directly with one or more other AMRs 102.

Communications between AMRs 102 may be directed to one or more individual AMRs and/or broadcast to multiple AMRs 102. Communications may be relayed by or more network components (e.g. access points) and/or via one or more other intermediate AMRs 102. Similarly, communications from the computing device 108 to the AMR(s) 102 may be directed to one or more individual AMRs and/or broadcast to multiple AMRs 102. Communications may be relayed by or more network components (e.g. access points) and/or via one or more other intermediate AMRs 102.

In the environment 100 as shown in FIG. 1, the computing device 108 is configured to communicate with one or more of the AMRs 102 to receive data from the AMRs 102 and to transmit data to the AMRs 102. This functionality may be additionally or alternatively be performed by other network infrastructure components that are capable of communicating directly or indirectly with the AMRs 102, such as the one or more cloud servers 110, for instance. However, the local nature of the computing device 108 may provide additional advantages in that the communication between the computing device 108 and the AMRs 102 may occur with reduced network latency. Thus, according to the disclosure, the computing device 108 is used as the primary example when describing this functionality, although it is understood that this is by way of example and not limitation. The one or more cloud servers 110 may function as a redundant system for the computing device 108.

The computing device 108 may thus receive sensor data from each for the AMRs 102 via the APs 104 and use the respective sensor data, together with other information about the environment 100 that is already known (e.g. data regarding the size and location of static objects 125 in the environment 100, last known locations of dynamic objects, etc.), to generate a shared environment model that represents the environment 100. This shared environment model may be represented as a navigation grid having cells of any suitable size and/or shape, with each cell having specific properties with respect to the type of object contained (or not contained) in the cell, whether an object 125 in the cell is static or moving, etc., which enables the environment model to accurately depict the nature of the environment 100. The environment model may thus be dynamically updated by the AMRs 102 directly and/or via the computing device 108 on a cell-by-cell basis as new sensor data is received from the AMRs 102 to generate an exploration policy for the AMRs 102. The updates to the shared environment model thus reflect any recent changes in the environment 100 such as the position and orientation of each of the AMRs 102 and other obstacles that may change in a dynamic manner within the environment 100 (e.g. people, forklifts, machinery, etc.). The shared environment model may additionally or alternatively be updated based upon data received from other sensors 120 or devices within the environment 100, such as stationary cameras for example, which may enable a more accurate depiction of the positions of the AMRs 102 without relying on AMR communications.

Each AMR 102 may execute a path planning algorithm (exploration policy) and uses the shared environment model at a particular time (e.g. the most recently constructed) to calculate navigational paths for each AMR 102. These navigational paths include sets of intermediate points ("waypoints") or nodes that define an AMR trajectory within the environment 100 between a starting point (e.g. its current location in the environment 100) to a destination (goal point) within the environment 100. That is, the waypoints indicate to the AMRs 102 how to execute a respective planned navigational path to proceed to each of the intermediate points at a specific time until a destination is reached. The path planning algorithm of one or more of the AMRs 102 may be updated by the computing device 108. According to the disclosure, the computing device 108, server 110, and/or AMR(s) 102 may implement machine-learning to adapt one or more algorithms and/or models configured to control the operation of the AMRs 104 within the environment 100.

Information dynamically discovered by the AMRs 102 may be, for instance, a result of each AMR 102 locally processing its respective sensor data. Because of the dynamic nature of the environment 100, each AMR 102 may calculate its own respective navigation path in a continuous and iterative manner based on its sensor data, senor or other data from one or more other AMRs 102, map data, and/or other data as would be understood by one of ordinary skill in the arts.

The computing device 108 may alternatively or additionally (potentially in collaboration with one or more of the AMRs 102) calculate navigational paths for one or more of the AMRs 102. Alternatively, or additionally, the cloud server(s) 110 may be configured to calculate navigational paths for one or more of the AMRs 102, which may then be transmitted to the AMRs 102. It should be appreciated that any combination of the AMRs 102, computing device 108, and cloud server(s) 110 may calculate the navigational paths. The AMRs 102, computing device 108, and/or cloud server(s) 110 may include processing circuitry that is configured to perform the respective functions of the AMRs 102, computing device 108, and/or cloud server(s) 110, respectively. One or more of these devices may further be implemented with machine-learning capabilities.

Information dynamically discovered by the AMRs 102 may be, for instance, a result of each AMR 102 locally processing its respective sensor data. The updated shared environment model may be maintained by computing device 108 (e.g. configured as a central controller) and shared with each of the AMRs 102 as well being used for planning tasks. Thus, at any given point in time, the AMRs 102 may be attempting to determine which cells to add to a particular route (e.g. a planned path) or move to so that the assigned tasks of the assigned tasks of the AMRs 102 may be accomplished in the most efficient manner. In other words, because of the dynamic nature of the environment 100, each AMR 102 may calculate its own respective navigation path in a continuous and iterative manner using iterative updates that are provided to the shared environment model. Thus, the shared environment model may be stored in the computing device 108 and/or locally in a memory associated with or otherwise accessed by each one of the AMRs 102. Additionally, or alternatively, the shared environment model may be stored in any other suitable components of the network infrastructure or devices connected thereto. In any event, the AMRs 102 may iteratively receive or otherwise access the shared environment model, including the most recent updates, to perform navigation path planning functions as discussed herein. The shared environment model may thus be updated as new sensor data is received by the central controller (computing device 108) and processed, and/or processed locally by the AMRs 102, and be performed in a periodic manner or in accordance with any suitable schedule. The teachings of the disclosure are also applicable to dynamic policies controlled by fleet management, such as rate controlling (e.g. using OneVPL rate controller) for video codecs allocating bits based on the data received from Lidar (e.g. higher quality for closer regions). Additionally, or alternatively, the teachings are also applicable to Inference Engine Heterogenous Logic (e.g. OpenVINO) being performed through extension of tools whether for offline or runtime inference engine libraries.

With reference to FIG. 2, and as discussed above, the AMRs 102 may implement a suite of onboard sensors 204 to generate sensor data indicative of the location, position, velocity, heading orientation, etc. of the AMR 102. The sensor data may indicate the presence of and/or range to various objects 125 near each AMR 102. Each AMR 102 may additionally process this sensor data to identify obstacles or other relevant information within the environment 100 that will impact the shared environment model. The AMRs 102 may then use the shared environment model to iteratively calculate respective navigation paths.

AMR Design and Configuration

Turning back to FIG. 2, a block diagram of an exemplary autonomous agent 200 in accordance with the disclosure is illustrated. The autonomous agent 200 as shown and described with respect to FIG. 2 may be identified with one or more of the AMRs 102 as shown in FIG. 1 and discussed herein. The autonomous agent 200 may include processing circuitry 202, one or more sensors 204, a transceiver 206, and a memory 210. The autonomous agent 200 may additionally include input/output (I/O) interface 208, drive 209 (e.g. when the agent 200 is a mobile agent), and/or manipulator 211. The components shown in FIG. 2 are provided for ease of explanation, and the autonomous agent 200 may implement additional, less, or alternative components as those shown in FIG. 2.

The processing circuitry 202 may be configured as any suitable number and/or type of computer processors, which may function to control the autonomous agent 200 and/or other components of the autonomous agent 200. The processing circuitry 202 may be identified with one or more processors (or suitable portions thereof) implemented by the autonomous agent 200. The processing circuitry 202 may be configured to carry out instructions to perform arithmetical, logical, and/or input/output (I/O) operations, and/or to control the operation of one or more components of autonomous agent 200 to perform various functions associated with the disclosure as described herein. For example, the processing circuitry 202 may include one or more microprocessor cores, memory registers, buffers, clocks, etc., and may generate electronic control signals associated with the components of the autonomous agent 200 to control and/or modify the operation of these components. For example, the processing circuitry 202 may control functions associated with the sensors 204, the transceiver 206, interface 208, drive 209, memory 210, and/or manipulator 211. The processing circuitry 202 may additionally perform various operations to control the movement, speed, and/or tasks executed by the autonomous agent 200, which may be based upon global and/or local path planning algorithms, as discussed herein.

The sensors 204 may be implemented as any suitable number and/or type of sensors that may be used for autonomous navigation and environmental monitoring. Examples of such sensors may include radar, LIDAR, optical sensors, Red-Green-Blue-Depth (RGBD) sensors, cameras, audio sensors, compasses, gyroscopes, positioning systems for localization, accelerometers, audio sensors, etc.

The transceiver 206 may be implemented as any suitable number and/or type of components configured to transmit and/or receive data packets and/or wireless signals in accordance with any suitable number and/or type of communication protocols. The transceiver 206 may include any suitable type of components to facilitate this functionality, including components associated with known transceiver, transmitter, and/or receiver operation, configurations, and implementations. Although depicted in FIG. 2 as a transceiver, the transceiver 206 may include any suitable number of transmitters, receivers, or combinations of these that may be integrated into a single transceiver or as multiple transceivers or transceiver modules. For example, the transceiver 206 may include components typically identified with an RF front end and include, for example, antennas, ports, power amplifiers (PAs), RF filters, mixers, local oscillators (LOs), low noise amplifiers (LNAs), upconverters, downconverters, channel tuners, etc. The transceiver 206 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

I/O interface 208 may be implemented as any suitable number and/or type of components configured to communicate with a human operator. The I/O interface 208 may include microphone(s), speaker(s), display(s), image projector(s), light(s), laser(s), and/or other interfaces as would be understood by one of ordinary skill in the arts.

The drive 209 may be implemented as any suitable number and/or type of components configured to drive the autonomous agent 200, such as a motor or other driving mechanism. The processing circuitry 202 may be configured to control the drive 209 to move the autonomous agent 200 in a desired direction and at a desired velocity.

The memory 210 stores data and/or instructions such that, when the instructions are executed by the processing circuitry 202, cause the autonomous agent 200 to perform various functions as described herein. The memory 210 may be implemented as any well-known volatile and/or non-volatile memory. The memory 210 may be implemented as a non-transitory computer readable medium storing one or more executable instructions such as, for example, logic, algorithms, code, etc. The instructions, logic, code, etc., stored in the memory 210 may enable the features disclosed herein to be functionally realized. For hardware implementations, the modules shown in FIG. 2 associated with the memory 210 may include instructions and/or code to facilitate control and/or monitor the operation of such hardware components.

The manipulator 211 may be implemented as any suitable number and/or type of components configured to interact with and/or manipulate the environment and/or object(s) 125 within the environment, such as a manipulator arm, claw, gripper, or other mechanism to interact with one or more objects 125.

Computing Device (Controller) Design and Configuration

Figure 3:
FIG. 3 illustrates a block diagram of an exemplary computing device (controller) in accordance with the disclosure.

FIG. 3 illustrates a block diagram of an exemplary computing device 300, in accordance with the disclosure. The computing device (controller) 300 as shown and described with respect to FIG. 3 may be identified with the computing device 108 and/or server 110 as shown in FIG. 1 and discussed herein, for instance. The computing device 300 may be implemented as an Edge server and/or Edge computing device, such as when identified with the computing device 108 implemented as an Edge computing device and/or as a cloud-based computing device when identified with the server 110 implemented as a cloud server.

The computing device 300 may include processing circuitry 302, one or more sensors 304, a transceiver 306, and a memory 310. In some examples, the computer device 300 is configured to interact with one or more external sensors (e.g. sensor 120) as an alternative or in addition to including internal sensors 304. The components shown in FIG. 3 are provided for ease of explanation, and the computing device 300 may implement additional, less, or alternative components as those shown in FIG. 3.

The processing circuitry 302 may be configured as any suitable number and/or type of computer processors, which may function to control the computing device 300 and/or other components of the computing device 300. The processing circuitry 302 may be identified with one or more processors (or suitable portions thereof) implemented by the computing device 300.

The processing circuitry 302 may be configured to carry out instructions to perform arithmetical, logical, and/or input/output (I/O) operations, and/or to control the operation of one or more components of computing device 300 to perform various functions as described herein. For example, the processing circuitry 302 may include one or more microprocessor cores, memory registers, buffers, clocks, etc., and may generate electronic control signals associated with the components of the computing device 300 to control and/or modify the operation of these components. For example, the processing circuitry 302 may control functions associated with the sensors 304, the transceiver 306, and/or the memory 310.

According to the disclosure, the processing circuitry 302 may be configured to: process data or information about the environment 100, including data received from one or more sensors 120 and/or data received from one or more AMRs 102, such as sensor data generated by the sensor(s) 204 of the AMRs 102; determine a task priority from one or more tasks of the AMRs 102; determine and update a global or AMR-specific priority policy; process (e.g. update and/or modify) local priority information received from the AMR (s) 102 (e.g. based on data or information about the environment 100, such as data from other AMR(s) 102 and/or sensor(s) 120); control the AMR(s) 102 to update their respective local priority information (e.g. based on modifications determined by computing device 300); and/or perform one or more other functions as would be understood by one of ordinary skill in the art.

Additionally, or alternatively, the processing circuitry 302 may be configured to: determine and/or select the type of AMR 102 to be deployed within the environment 100; control (possibly in collaboration with the AMR(s) 102) the operation of the AMR(s) 102 within the environment 100, such as controlling the AMR(s) 102 to explore the environment 100, controlling the AMR(s) 102 to gather additional data or information about the environment 100, and/or controlling the AMR(s) 102 to gather information or data for a location within the environment 100 that may be insufficiently identified or known to the system (e.g. due to a lack of sensors 120 at the location); and/or perform one or more other functions as would be understood by one of ordinary skill in the art.

The sensors 304 may be implemented as any suitable number and/or type of sensors that may be used for autonomous navigation and environmental monitoring. Examples of such sensors may include radar, LIDAR, optical sensors, Red-Green-Blue-Depth (RGBD) sensors, cameras, audio sensors, compasses, gyroscopes, positioning systems for localization, accelerometers, etc. In some examples, the computing device 300 is additionally or alternatively configured to communicate with one or more external sensors similar to sensors 304 (e.g. sensor 120 in FIG. 1).

The transceiver 306 may be implemented as any suitable number and/or type of components configured to transmit and/or receive data packets and/or wireless signals in accordance with any suitable number and/or type of communication protocols. The transceiver 306 may include any suitable type of components to facilitate this functionality, including components associated with known transceiver, transmitter, and/or receiver operation, configurations, and implementations. Although depicted in FIG. 3 as a transceiver, the transceiver 306 may include any suitable number of transmitters, receivers, or combinations of these that may be integrated into a single transceiver or as multiple transceivers or transceiver modules. For example, the transceiver 306 may include components typically identified with an RF front end and include, for example, antennas, ports, power amplifiers (PAs), RF filters, mixers, local oscillators (LOs), low noise amplifiers (LNAs), upconverters, downconverters, channel tuners, etc. The transceiver 306 may also include analog-to-digital converters (ADCs), digital to analog converters, intermediate frequency (IF) amplifiers and/or filters, modulators, demodulators, baseband processors, and/or other communication circuitry as would be understood by one of ordinary skill in the art.

The memory 310 stores data and/or instructions such that, when the instructions are executed by the processing circuitry 302, cause the computing device 300 to perform various functions as described herein. The memory 310 may be implemented as any well-known volatile and/or non-volatile memory. The memory 310 may be implemented as a non-transitory computer readable medium storing one or more executable instructions such as, for example, logic, algorithms, code, etc. The instructions, logic, code, etc., stored in the memory 310 are may be represented by various modules which may enable the features described herein to be functionally realized. For example, the memory 310 may include one or more modules representing an algorithm, such a path planning module configured to perform the path planning operations. For hardware implementations, the modules associated with the memory 310 may include instructions and/or code to facilitate control and/or monitor the operation of such hardware components. Thus, the disclosure includes the processing circuitry 302 executing the instructions stored in the memory in conjunction with one or more hardware components to perform the various functions described herein.

AMR Configuration

Figure 4:
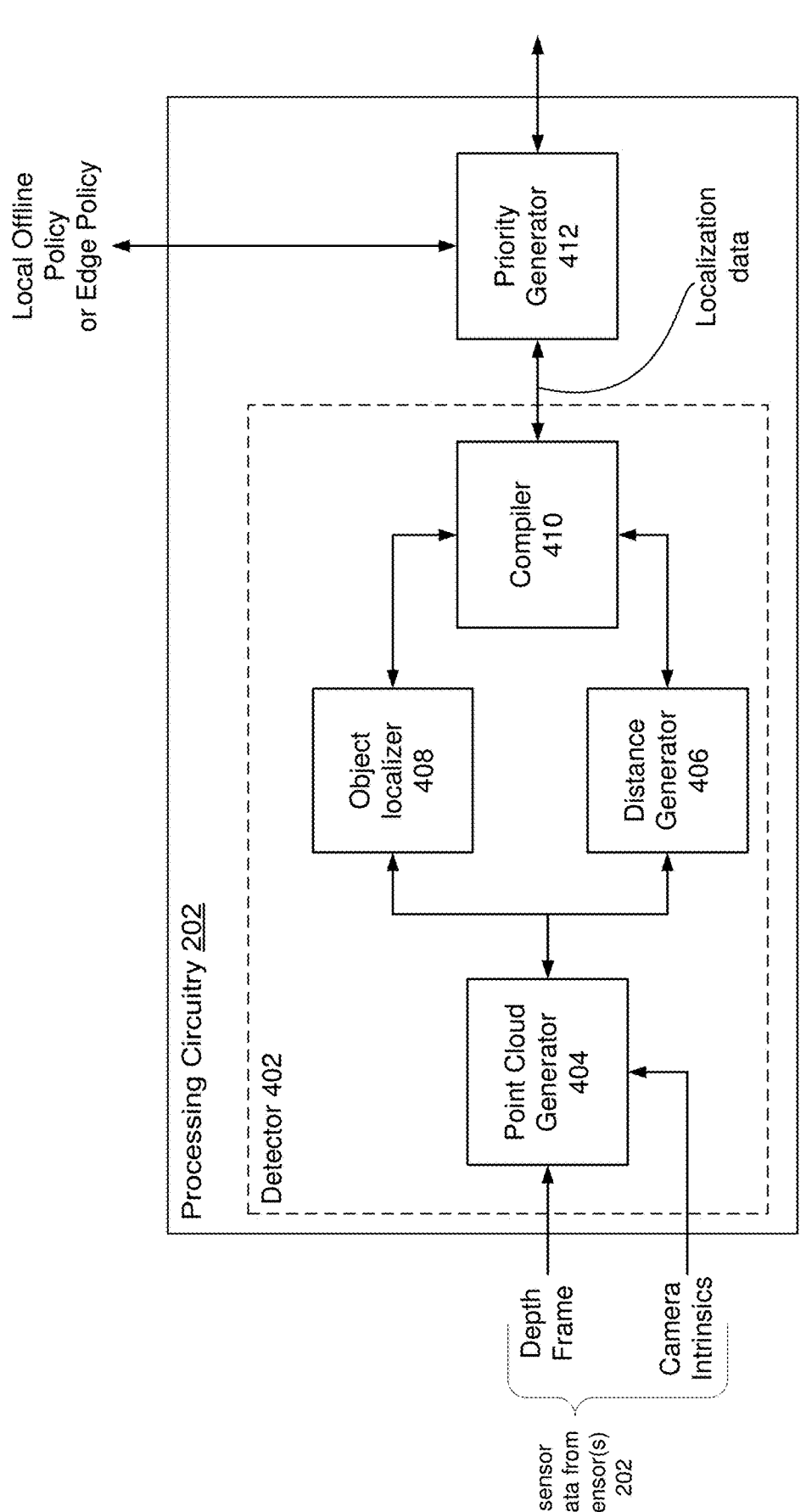
FIG. 4 illustrates a block diagram of an exemplary AMR in accordance with the disclosure.

FIG. 4 illustrates a block diagram of an exemplary processing pipeline of the AMR 102 of FIG. 2 in accordance with the disclosure. According to the disclosure, the processing pipeline may be embodied in the processing circuitry 202 of the AMR 102.

The processing circuitry 202 may include a detector 402 and priority generator 412. The detector 402 may be configured to localize or otherwise detect one or more objects 125 within the environment 100, such as one or humans, other AMRs, and/or one or more other static and/or dynamic objects within the environment 100. The dashed communication lines between the objects 125 and the AMR 102 shown in FIG. 1 may represent the detection of the object 125 by the AMR 102. The detection may be based on, for example, sensor data received from one or more sensor(s) 202 and/or sensor(s) 120. The detector 402 may generate localization data corresponding to the localized object and provide the localization data to the priority generator 412.

The priority generator 412 may be configured to determine a corresponding priority for one or more localized objects 125 (FIG. 1) based on the localization data. The priorities may include, for example, various priority levels, such as "low," "medium," and "high." The number of priority levels are not limited to the three example levels and can include fewer or additional priority levels as would be understood by one of ordinary skill in the art.

According to the disclosure, the priority generator 412 may be configured to generate a priority list that includes one or more object priorities based on the localization data and/or a priority policy. The priority list may include the corresponding priority of the localized objects and associate the priorities with the corresponding localization data of the object 125.

The priority policy may be a local offline policy and/or a policy provided by (and/or updated by) one or more external components, such as one or more Edge computing devices (e.g. device 108) and/or one or more remote computing devices (e.g. servers 110). The policy may be generated offline and customized based on the particular use case. As discussed, the policy may be updated in real time by one or more computing devices, such as an Edge computing device (e.g. computing device 108) and/or the external servers (e.g. cloud server 110). The policy may define priorities based on one or more factors, such as distance to the object, size and/or shape of the object, dimensions of the bounding box (e.g. are the dimensions typical for a human object, etc.), and/or one or more other factors as would be understood by one of ordinary skill in the art.

According to the disclosure, the external computing device (e.g. computing device 108 and/or sever 110) may have an increased view (e.g. global or holistic view) of the environment 100 as compared to one or more individual AMRs 102 based on the external computing device's access to additional information and data. Such additional data may be from, for example: one or more sensors 120 within the environment 100, one or more other AMRs 102 within the environment 100, and/or one or more other sources as would be understood by one of ordinary skill in the art. Additionally, or alternatively, the external computing device may leverage telemetry information from one or more of the AMRs 102 within the environment 100 to determine the priority policy. With this holistic knowledge of the environment 100, the external computing device (e.g. devices 108 and/or 110) will advantageously have the capability to update the priority policy in real time for an improved prioritization.

According to the disclosure, the priority generator 412 may be configured to provide the priority list and/or one or more object priorities to one or more other components of the AMR 102, one or more upstream and/or downstream processors of the processing pipeline, one or more external computing devices (e.g. Edge device 108, server 110), one or more other AMRs 102 within the environment 100, and/or other device(s) as would be understood by one of ordinary skill in the art. According to the disclosure, the processing circuitry 202 (e.g. the priority generator 412) may be configured to provide the priority list, one or more object priorities, and/or the local policy to one or more external computing devices (e.g. Edge device 108, server 110) and receive an updated priority list, updated object priorities, and/or updated policy from the external computing device. In this example, the processing circuitry 202 (e.g. the priority generator 412) may send a request to the external computing device(s) requesting an update to the priority list, one or more object priorities, and/or policy, and receive the updated priority list, updated object priorities, and/or updated policy in return.

According to the disclosure, the external computing devices (e.g. Edge device 108, server 110) may be configured to update the priority list and/or one or more object priorities based on the external computing device's holistic knowledge of the environment 100 gleaned from, for example, additional information and/or data accessible to the external computing device(s), such as data from one or more sensors 120 within the environment 100, data from one or more other AMRs 102 within the environment 100, telemetry information from the AMR 102 and/or one or more other AMRs 102 within the environment 100, and/or data from one or more other sources as would be understood by one of ordinary skill in the art.

The updating may include, for example, the computing device modifying the priority list to instruct the AMR 102 to offload some or all processing of data associated with one or more objects to the computing device. In another example, the computing device may modify the priority list to decrease the priority for a particular object because, for example, the computing device prefers another AMR 102 handle processing of the data for that object and/or the object data has been previously processed. Similarly, the computing device may modify the priority list to increase the priority for the object because the computing device prefers the AMR 102 process the object data instead of another AMR 102 in the environment 100. Another example includes the computing device providing object data obtained by another AMR 102, senor 120, and/or other device in the environment to the AMR 102 with a corresponding addition to the AMR's priority list to instruct the AMR 102 to process the object data. According to the disclosure, the priority list may be updated to adjust the respective priorities based on one or more factors, including, for example, distance to the object, size and/or shape of the object, dimensions of the bounding box (e.g. are the dimensions typical for a human object, etc.), and/or one or more other factors as would be understood by one of ordinary skill in the art.

Figure 5:
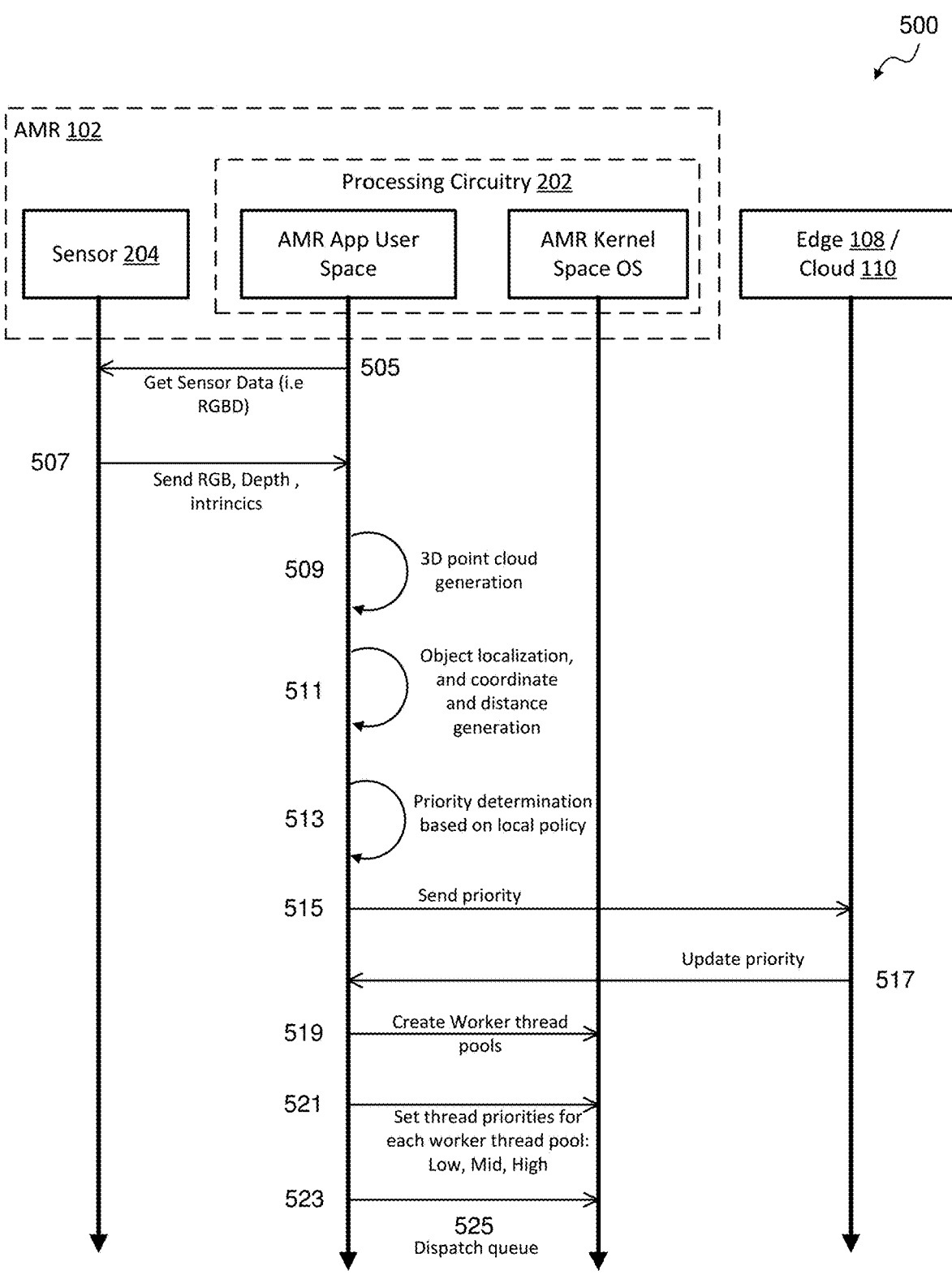
FIG. 5 illustrates an operational flowchart of a prioritization method in accordance with the disclosure.

The localization, priority determination, and priority update operations are illustrated in FIG. 5, which is discussed in more detail below.

According to the disclosure, the determined object priorities, priority list, and/or priority policy may be used to define a processing schedule (of the AMR 102) implemented by the processing circuitry 202. For example, the priority level associated with a localized object and contained within the priority list may be used to determine the priority at which the sensor data (localization data) for the detected/localized object 125 is processed by the processing circuitry 202 of the AMR 102 to, for example, classify the object. For example, the further processing of the data according to the priority scheduling may be used to classify the localized object based on one or more characteristics of the localized object (e.g. are the dimensions typical for a human object, another AMR, equipment, etc.). The classification of the object may be used to further identify the localized object (e.g. is it a human, another AMR, another stationary or moving object). The processing circuitry 202 may control the AMR 102 to implement the processing schedule based on the priority list. For example, if the distance to the detected object 125 exceeds a threshold distance value (e.g. the object is not in the immediate proximity of the AMR 102), the processing of the sensor data (localization data) associated with the object 125 may be given a lower priority level so that processing resources may be used to process data associated with one or more objects that are closer to the AMR 102. The further processing of the data according to the priority scheduling information (e.g. determined from the priority list) can be performed by the processing circuitry 202, such as one or more upstream and/or downstream processors of the processing pipeline, one or more external computing devices (e.g. Edge device 108, server 110), one or more other AMRs 102 within the environment 100, and/or other device(s) as would be understood by one of ordinary skill in the art.

According to the disclosure, the detector 402 may include a point cloud generator 404, an object localizer 408, a distance generator 406 and a compiler 410. The point cloud generator 404 may be configured to generate a point cloud of the object 125 based on the sensor data. In the configuration illustrated in FIG. 4, the sensor data is generated from a Red-Green-Blue-Depth (RGBD) sensor, but is not limited thereto. In this example, the sensor data may include a depth frame and camera intrinsic information. The camera intrinsic information and the depth frame may be used to perform a 3D deprojection to obtain the point cloud. Alternatively, if the sensor data is generated from a 3D LIDAR sensor, the 3D point cloud may be obtained directly from sensor.

The object localizer 408 may be configured to determine a bounding box that contains the object 125. The bounding box may be generated based on the point cloud from the point cloud generator 404. The bounding box may be a three-dimensional (3D) bounding box having 3D data. In this example, the bounding box may include width, height, and depth (w, h, d) values. According to the disclosure, the generation of the bounding box may use an efficient low compute algorithm, such as a density-based spatial clustering of applications with noise (DBSCAN) algorithm. In such examples that implement a DBSCAN algorithm, machine vision processing may be used that includes capturing 3D spatial data representing a field of view and including ranging measurements to various points within the field of view, and applying a segmentation algorithm to the 3D spatial data to produce a segmentation assessment indicating a presence of individual objects within the field of view. The segmentation algorithm may be based on at least one adjustable parameter, and the adjusting of a value of the at least one adjustable parameter may be based on the ranging measurements. The segmentation assessment may be based on application of the segmentation algorithm to the 3D spatial data, with different values of the at least one adjustable parameter value corresponding to different values of the ranging measurements of the various points within the field of view.

The distance generator 406 may be configured to determine coordinates (e.g. x, y, z, coordinates) of the object 125 based on the point cloud. The determined coordinates may be a centroid (e.g. center point of the object 125). Based on the determined coordinates, the distance generator 406 may be configured to determine a distance to the object 125. The compiler 410 may be configured to compile the bounding box determined the object localizer 408, the coordinates and/or distance determined by the distance generator 406, and/or the point cloud determined by the point cloud generator 404, and to generate the localization data based on the compiled information. Additionally, or alternatively, the compiler 410 may generate the location data based directly on the sensor data from the sensor 202.

Motion Planning Algorithm

FIG. 5 illustrates a flowchart of an exemplary prioritization method 500 in accordance with the disclosure. The method 500 shown may be performed by each AMR 102 in cooperation with the computing device 108 and/or 110. Two or more of the various operations illustrated in FIG. 5 may be performed simultaneously in some configurations. Further, the order of the various operations is not limiting and the operations may be performed in a different order in some configurations.

The flowchart 500 begins at 505, where the processing circuitry 202 may request sensor data from one or more sensors. In some examples, the sensor(s) 202 may automatically provide sensor data without being requested to doing so.

After operation 505, the flowchart transitions to operation 507, where the sensor 202 provides sensor data to the processing circuitry 202. In this example, the sensor 202 is a RGBD sensor and the sensor 202 provides both a depth and camera intrinsics.

After operation 507, the flowchart transitions to operation 509, where the 3D point cloud is generated by the processing circuitry 202 based on the received sensor data. For example, the point cloud generator 404 may generate the point cloud based on the depth frame and camera intrinsics.

After operation 509, the flowchart transitions to operation 511, where the object is localized by the processing circuitry 202 based on the received sensor data (e.g. based on the point cloud). For example, localizer 408 may generate a bounding box based on the point cloud. The distance generator 406 may determine the coordinates of the object and/or distance to the object based on the point cloud. The localization data may then be determined by the compiler 410 based on the bounding box, coordinates, distance, and/or point cloud.

After operation 511, the flowchart transitions to operation 513, where the object priority and priority list may be generated based on the localization data. For example, the priority generator 412 of the processing circuitry 202 may be configured to determine the priority for the object(s) and the priority list based on local policy and the localization data. The priority generator 412 may reorder the priority list based on the respective priorities of the associated objects included in the priority list.

After operation 513, the flowchart transitions to operation 515, where the priorities, priority list, and/or policy may be provided to the Edge device 108 and/or server 110. This transmission may additionally include a request for the Edge device 108 and/or server 110 to update the received information.

After operation 515, the flowchart transitions to operation 517, where the Edge device 108 and/or server 110 update the priorities, priority list, and/or policy. For example, the priority list may be reordered based on adjusted priorities. The Edge device 108 and/or server 110 may then provide the updated information to the AMR 102. According to the disclosure, the flowchart 500 may proceed to operation 519 in the absence of receiving the updated information from the Edge device 108 and/or server 110 after a specified waiting period. For example, if the AMR 102 has not received the updated information after expiration of a waiting period, the AMR 102 can utilize the non-updated priority list, priorities, and/or policy. The waiting period may be a fixed period, or may be dynamically adjusted based on one or more characteristics of the environment.

After operation 517, the flowchart transitions to operation 519, where the worker thread pools are generated based on the priority list, priorities, and/or policy that were updated in operation 517 and or the non-updated priority list, priorities, and/or policy if no update is received.

After operation 519, the flowchart transitions to operation 521, where the thread priorities for the worker threads are set. For example, the threads can be associated with a particular priority level (e.g. low, medium, high).

After operation 521, the flowchart transitions to operation 523, where the queue is dispatched for processing according to the worker thread pools. For example, the data for the object may be processed according to the established processing queue.

Figure 6:
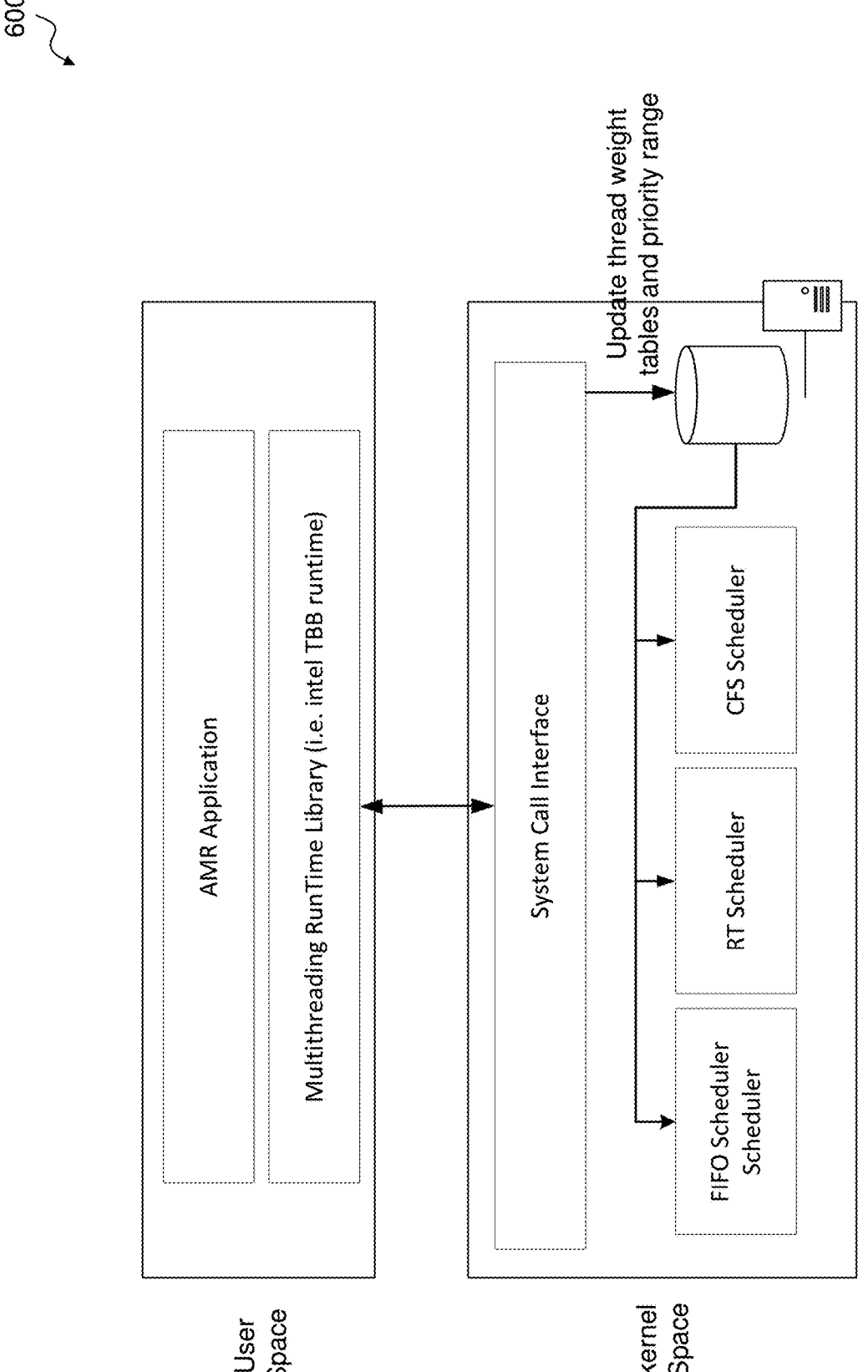
FIGS. 6-8 illustrate example scheduler implementations in accordance with the disclosure.
Figure 7:
Figure 7:
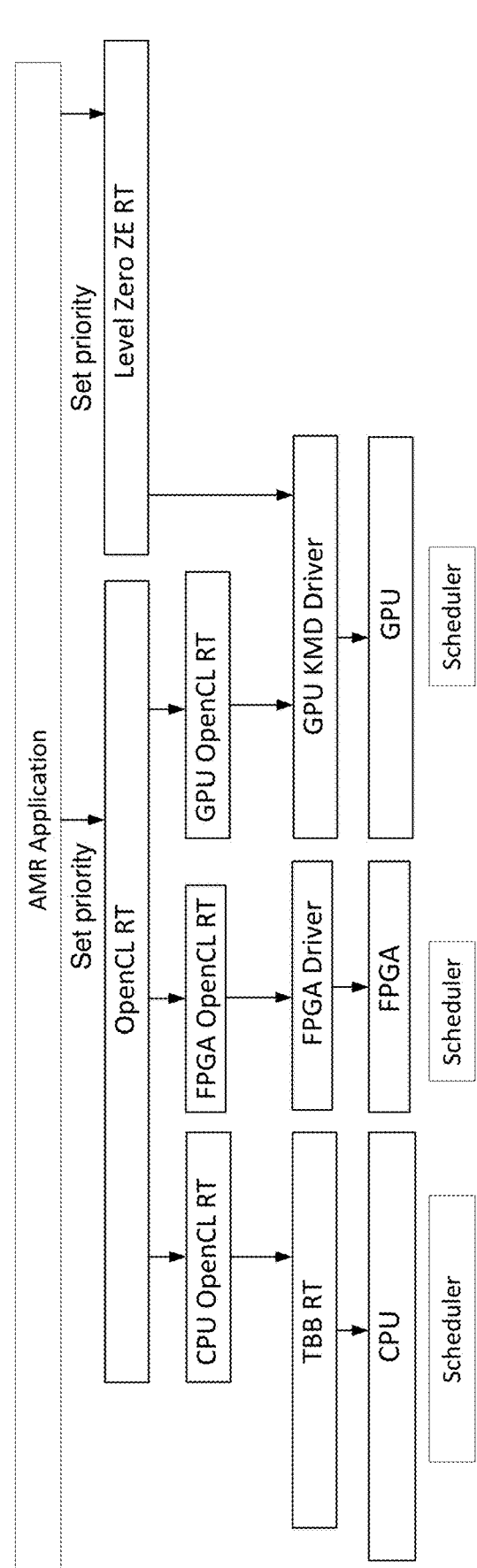
Figure 8:

FIGS. 6-8 illustrate different scheduler implementations. FIG. 6 illustrates example scheduling 600 that may be controlled to facilitate the processing schedule according to the priority list, priorities, and local policy. The schedulers may include, for example, Completely Fair scheduler (CFS), First-in First-out (FIFO), and Real Time (RT).

FIG. 7 illustrates scheduling 700 using different compute units using oneAPI concepts. In this example, the scheduling can be dispatched on different XPU statically.

FIG. 8 illustrates an implementation using a Unified Runtime for multi-XPU computing environment 800. This example takes advantage of oneAPI runtime for dynamically dispatching the objects. According to this example configuration, the CPU is driven as an XPU instance in a multi-XPU platform. The appropriate XPUs to use in a multi-XPU platform are dynamically selected, the computation is distributed across a multi-XPU platform, and the application can be pushed once priority are set to the OneAPI runtime using a scoring policy. An example process using Unified Runtime for multi-XPU computing may include the following operations, which are referenced in the drawing by operations 1-8 and include: (1) APFRs (Applications, Performance libraries, Frameworks, Runtimes) submit work that is automatically assigned to an Execution Resource via the Invocation API (application programming interface), (2) The Invocation API uses a Scoring Policy that implements the logic for selecting an Execution Resource. Support for standard and custom Scoring Policies may be included, (3) The Scoring Policy obtains information about the state of the platform and application via Discovery & Telemetry, (4) The Scoring Policy interacts with the Execution Resources via the Scheduler, which defines the Execution Resources, objects for waiting for work and a submit function. Support for standard and custom Schedulers may be provided, (5) The Scheduler interacts with the execution targets via an Execution Resource object, (6) The Scheduler both uses and provides support for Telemetry and Discovery functions, (7) APFRs can use Scoring Policies to select an Execution Resource if they choose to manage submissions directly, (8) APFRs can submit work directly to Execution Resources obtained via a Scoring Policy, and (9) APFRs can use Discovery directly to learn about the state of the platform or application. APFRs that submit directly to Execution Resources (edge 8), may need to report specific events and metrics via the Telemetry APIs.

EXAMPLES

The following examples pertain to various techniques of the present disclosure.

An example (e.g. example 1) relates to an apparatus comprising: an interface configured to receive sensor data; and processing circuitry that is configured to: localize an object based on the sensor data to determine localization data; determine a priority list based on the localization data and a priority policy, the priority list including a priority of the object; and control the apparatus to implement a processing schedule based on the priority list.

Another example (e.g. example 2) relates to a previously-described example (e.g. example 1), wherein, to localize the object, the processing circuitry is configured to: generate a point cloud of the object based on the sensor data; determine a bounding box of the object based on the point cloud; determine coordinates of the object based on the point cloud; and determine a distance to the object based on the determined coordinates, wherein the localization data is determined based on the bounding box, the coordinates, or the distance.

Another example (e.g. example 3) relates to a previously-described example (e.g. example 2), wherein the processing circuitry is configured to determine three dimensions of the bounding box.

Another example (e.g. example 4) relates to a previously-described example (e.g. example 2), wherein determining coordinates of the object comprises determining a centroid of the object.

Another example (e.g. example 5) relates to a previously-described example (e.g. one or more of examples 1-4), wherein the priority list associates the priority of the object with the corresponding localization data of the object.

Another example (e.g. example 6) relates to a previously-described example (e.g. example 5), wherein the localization data comprises coordinates of the object, a distance to the object, or a bounding box of the object.

Another example (e.g. example 7) relates to a previously-described example (e.g. one or more of examples 1-6), wherein the processing circuitry is further configured to process the sensor data for the localized object according to the processing schedule to classify the object.

Another example (e.g. example 8) relates to a previously-described example (e.g. one or more of examples 1-7), wherein the processing circuitry is further configured to provide the priority list to an external computing device and update the priority list based on a request from the external computing device.

Another example (e.g. example 9) relates to a previously-described example (e.g. one or more of examples 1-8), wherein the processing circuitry is further configured to update the priority list based on external information received by the apparatus.

Another example (e.g. example 10) relates to a previously-described example (e.g. example 9), wherein the external information comprises: sensor data from one or more external sensors, or data from another device sharing an environment of the apparatus.

Another example (e.g. example 11) relates to a previously-described example (e.g. one or more of examples 1-10), wherein apparatus is a controller of an autonomous agent.

An example (e.g. example 12) relates to an apparatus comprising: a detector configured to detect an object based on sensor data and to generate object information corresponding to the detected object; and priority generator configured to determine a priority list based on a priority policy and the object information, the priority list including a priority of the detected object, wherein the apparatus is controlled to implement a processing schedule based on the priority list.

Another example (e.g. example 13) relates to a previously-described example (e.g. example 12), wherein the detector comprises: point cloud generator configured to generate a point cloud of the object based on the sensor data; a localizer configured to determine a bounding box of the object based on the point cloud; a distance generator configured to: determine coordinates of the object based on the point cloud, and determine a distance to the object based on the determined coordinates; and a compiler configured to generate the object information based on the bounding box, the coordinates, or the distance.

Another example (e.g. example 14) relates to a previously-described example (e.g. example 13), wherein the compiler is configured to generate the object information based on the bounding box, the coordinates, and the distance.

Another example (e.g. example 15) relates to a previously-described example (e.g. example 13), wherein the localizer is configured to determine three dimensions of the bounding box.

Another example (e.g. example 16) relates to a previously-described example (e.g. example 13), wherein the coordinates of the object comprise a centroid of the object.

Another example (e.g. example 17) relates to a previously-described example (e.g. one or more of examples 12-16), wherein the priority list associates the priority of the object with the corresponding object information of the object.

Another example (e.g. example 18) relates to a previously-described example (e.g. example 17), wherein the object information comprises a bounding box of the object, coordinates of the object, or a distance from the apparatus to the object.

Another example (e.g. example 19) relates to a previously-described example (e.g. one or more of examples 12-18), wherein the detector is further configured to process the sensor data for the detected object according to the processing schedule to classify the object.

Another example (e.g. example 20) relates to a previously-described example (e.g. one or more of examples 12-19), wherein the priority generator is further configured to provide priority list to an external computing device and update the priority list based on a request from the external computing device.

An example (e.g. example 21) relates to an apparatus comprising: interface means for receiving sensor data; and processing means for: localizing an object based on the sensor data to determine localization data; determining a priority list based on the localization data and a priority policy, the priority list including a priority of the object; and controlling the apparatus to implement a processing schedule based on the priority list.

Another example (e.g. example 22) relates to a previously-described example (e.g. example 21), wherein, to localize the object, the processing means is configured to: generate a point cloud of the object based on the sensor data; determine a bounding box of the object based on the point cloud; determine coordinates of the object based on the point cloud; and determine a distance to the object based on the determined coordinates, wherein the localization data is determined based on the bounding box, the coordinates, or the distance.

Another example (e.g. example 23) relates to a previously-described example (e.g. example 22), wherein the processing means is configured to determine three dimensions of the bounding box.

Another example (e.g. example 24) relates to a previously-described example (e.g. example 22), wherein determining coordinates of the object comprises determining a centroid of the object.

Another example (e.g. example 25) relates to a previously-described example (e.g. one or more of examples 21-24), wherein the priority list associates the priority of the object with the corresponding localization data of the object.

Another example (e.g. example 26) relates to a previously-described example (e.g. example 25), wherein the localization data comprises coordinates of the object, a distance to the object, or a bounding box of the object.

Another example (e.g. example 27) relates to a previously-described example (e.g. one or more of examples 21-26), wherein the processing means is further configured to process the sensor data for the localized object according to the processing schedule to classify the object.

Another example (e.g. example 28) relates to a previously-described example (e.g. one or more of examples 21-27), wherein the processing means is further configured to provide the priority list to an external computing device and update the priority list based on a request from the external computing device.

Another example (e.g. example 29) relates to a previously-described example (e.g. one or more of examples 21-28), wherein the processing means is further configured to update the priority list based on external information received by the apparatus.

Another example (e.g. example 30) relates to a previously-described example (e.g. example 29), wherein the external information comprises: sensor data from one or more external sensors, or data from another device sharing an environment of the apparatus.

Another example (e.g. example 31) relates to a previously-described example (e.g. one or more of examples 21-30), wherein apparatus is a controller of an autonomous agent.

An example (e.g. example 32) relates to an apparatus comprising: detecting means for detecting an object based on sensor data and for generating object information corresponding to the detected object; and priority generating means for determining a priority list based on a priority policy and the object information, the priority list including a priority of the detected object, wherein the apparatus is controlled to implement a processing schedule based on the priority list.

Another example (e.g. example 33) relates to a previously-described example (e.g. example 32), wherein the detecting means comprises: point cloud generating means for generating a point cloud of the object based on the sensor data; localizing means for determining a bounding box of the object based on the point cloud; distance generating means for: determining coordinates of the object based on the point cloud, and determining a distance to the object based on the determined coordinates; and compiling means for generating the object information based on the bounding box, the coordinates, or the distance.

Another example (e.g. example 34) relates to a previously-described example (e.g. example 33), wherein the compiling means is configured to generate the object information based on the bounding box, the coordinates, and the distance.

Another example (e.g. example 35) relates to a previously-described example (e.g. example 33), wherein the localizing means is configured to determine three dimensions of the bounding box.

Another example (e.g. example 36) relates to a previously-described example (e.g. example 33), wherein the coordinates of the object comprise a centroid of the object.

Another example (e.g. example 37) relates to a previously-described example (e.g. one or more of examples 32-36), wherein the priority list associates the priority of the object with the corresponding object information of the object.

Another example (e.g. example 38) relates to a previously-described example (e.g. example 37), wherein the object information comprises a bounding box of the object, coordinates of the object, or a distance from the apparatus to the object.

Another example (e.g. example 39) relates to a previously-described example (e.g. one or more of examples 32-38), wherein the detecting means is further configured to process the sensor data for the detected object according to the processing schedule to classify the object.

Another example (e.g. example 40) relates to a previously-described example (e.g. one or more of examples 32-39), wherein the priority generating means is further configured to provide priority list to an external computing device and update the priority list based on a request from the external computing device.

Another example (e.g. example 41) relates to a non-transitory computer-readable medium having instructions stored thereon that, when executed by processing circuitry of an apparatus, cause the processing circuitry: localize an object based on sensor data to determine localization data; determine a priority list based on the localization data and a priority policy, the priority list including a priority of the object; and control the apparatus to implement a processing schedule based on the priority list.

Another example (e.g. example 42) relates to a previously-described example (e.g. example 41), wherein, localizing the object comprises: generating a point cloud of the object based on the sensor data; determining a bounding box of the object based on the point cloud; determining coordinates of the object based on the point cloud; and determining a distance to the object based on the determined coordinates, wherein the localization data is determined based on the bounding box, the coordinates, or the distance.

Another example (e.g. example 43) relates to a previously-described example (e.g. example 42), wherein the processing circuitry is configured to determine three dimensions of the bounding box.

Another example (e.g. example 44) relates to a previously-described example (e.g. example 42), wherein determining coordinates of the object comprises determining a centroid of the object.

Another example (e.g. example 45) relates to a previously-described example (e.g. one or more of examples 41-44), wherein the priority list associates the priority of the object with the corresponding localization data of the object.

Another example (e.g. example 46) relates to a previously-described example (e.g. example 45), wherein the localization data comprises coordinates of the object, a distance to the object, or a bounding box of the object.

Another example (e.g. example 47) relates to a previously-described example (e.g. one or more of examples 41-46), wherein the processing circuitry is further configured to process the sensor data for the localized object according to the processing schedule to classify the object.

Another example (e.g. example 48) relates to a previously-described example (e.g. one or more of examples 41-47), wherein the processing circuitry is further configured to provide the priority list to an external computing device and update the priority list based on a request from the external computing device.

Another example (e.g. example 49) relates to a previously-described example (e.g. one or more of examples 41-48), wherein the processing circuitry is further configured to update the priority list based on external information received by the apparatus.

Another example (e.g. example 50) relates to a previously-described example (e.g. example 49), wherein the external information comprises: sensor data from one or more external sensors, or data from another device sharing an environment of the apparatus.

Another example (e.g. example 51) relates to a previously-described example (e.g. one or more of examples 41-50), wherein apparatus is a controller of an autonomous agent.

Another example (e.g. example 52) relates to a prioritization method comprising: localizing an object based on sensor data to determine localization data; determining a priority list based on the localization data and a priority policy, the priority list including a priority of the object; and controlling a processor to implement a processing schedule based on the priority list.

Another example (e.g. example 53) relates to a previously-described example (e.g. example 52), wherein, localizing the object comprises: generating a point cloud of the object based on the sensor data; determining a bounding box of the object based on the point cloud; determining coordinates of the object based on the point cloud; and determining a distance to the object based on the determined coordinates, wherein the localization data is determined based on the bounding box, the coordinates, or the distance.

Another example (e.g. example 54) relates to a previously-described example (e.g. example 53), wherein determining the bounding box comprises determining three dimensions of the bounding box.

Another example (e.g. example 55) relates to a previously-described example (e.g. example 53), wherein determining coordinates of the object comprises determining a centroid of the object.

Another example (e.g. example 56) relates to a previously-described example (e.g. one or more of examples 52-55), wherein the priority list associates the priority of the object with the corresponding localization data of the object.

Another example (e.g. example 57) relates to a previously-described example (e.g. example 56), wherein the localization data comprises coordinates of the object, a distance to the object, or a bounding box of the object.

Another example (e.g. example 58) relates to a previously-described example (e.g. one or more of examples 52-57), further comprising processing the sensor data for the localized object according to the processing schedule to classify the object.

Another example (e.g. example 59) relates to a previously-described example (e.g. one or more of examples 52-58) further comprising providing the priority list to an external computing device and update the priority list based on a request from the external computing device.

Another example (e.g. example 60) relates to a previously-described example (e.g. one or more of examples 52-59), further comprising updating the priority list based on external information received by the processor.

Another example (e.g. example 61) relates to a previously-described example (e.g. example 60), wherein the external information comprises: sensor data from one or more external sensors, or data from another device sharing an environment of an apparatus comprising the processor.

Another example (e.g. example 62) relates to a previously-described example (e.g. one or more of examples 52-61), wherein the processor is comprised within a controller of an autonomous agent.

Another example (e.g. example 63) relates to a non-transitory computer-readable medium having instructions stored thereon that, when executed by processing circuitry of an apparatus, causes the apparatus to perform the operations of any of Examples 52-62.

Another example (e.g. example 64) relates to non-transitory computer-readable storage medium with an executable program stored thereon, that when executed, instructs a processor to perform a method as shown and described.

Another example (e.g. example 65) relates to an autonomous agent as shown and described.

Another example (e.g. example 66) relates to an apparatus as shown and described.

Another example (e.g. example 67) relates a method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor," "processing circuitry," or "controller" as used herein may be understood as any kind of technological entity that allows handling of data. The data may be handled according to one or more specific functions executed by the processor, processing circuitry, or controller. Further, processing circuitry, a processor, or a controller as used herein may be understood as any kind of circuit, e.g., any kind of analog or digital circuit. Processing circuitry, a processor, or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as processing circuitry, a processor, controller, or logic circuit. It is understood that any two (or more) of the processors, controllers, logic circuits, or processing circuitries detailed herein may be realized as a single entity with equivalent functionality or the like, and conversely that any single processor, controller, logic circuit, or processing circuitry detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). Processing circuitry, a processor, or a controller may transmit or receive data over a software-level connection with another processor, controller, or processing circuitry in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

An "agent" may be understood to include any type of driven object. An agent may be a driven object with a combustion engine, a reaction engine, an electrically driven object, a hybrid driven object, or a combination thereof. An agent may be or may include a moving robot, a personal transporter, a drone, and the like.

The term "autonomous agent" may describe an agent that implements all or substantially all navigational changes, at least during some (significant) part (spatial or temporal, e.g., in certain areas, or when ambient conditions are fair, or on highways, or above or below a certain speed) of some drives. Sometimes an "autonomous agent" is distinguished from a "partially autonomous agent" or a "semi-autonomous agent" to indicate that the agent is capable of implementing some (but not all) navigational changes, possibly at certain times, under certain conditions, or in certain areas. A navigational change may describe or include a change in one or more of steering, braking, or acceleration/deceleration of the agent. An agent may be described as autonomous even in case the agent is not fully automatic (fully operational with driver or without driver input). Autonomous agents may include those agents that can operate under driver control during certain time periods and without driver control during other time periods. Autonomous agents may also include agents that control only some implementations of agent navigation, such as steering (e.g., to maintain an agent course between agent lane constraints) or some steering operations under certain circumstances (but not under all circumstances), but may leave other implementations of agent navigation to the driver (e.g., braking or braking under certain circumstances). Autonomous agents may also include agents that share the control of one or more implementations of agent navigation under certain circumstances (e.g., hands-on, such as responsive to a driver input) and agents that control one or more implementations of agent navigation under certain circumstances (e.g., hands-off, such as independent of driver input). Autonomous agents may also include agents that control one or more implementations of agent navigation under certain circumstances, such as under certain environmental conditions (e.g., spatial areas, roadway conditions). In some implementations, autonomous agents may handle some or all implementations of braking, speed control, velocity control, and/or steering of the agent. An autonomous agent may include those agents that can operate without a driver. The level of autonomy of an agent may be described or determined by the Society of Automotive Engineers (SAE) level of the agent (as defined by the SAE in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The systems and methods of the disclosure may utilize one or more machine learning models to perform corresponding functions of the agent (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. According to the disclosure, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

The systems and methods of the disclosure may utilize one or more classification models. In a classification model, the outputs may be restricted to a limited set of values (e.g., one or more classes). The classification model may output a class for an input set of one or more input values. An input set may include road condition data, event data, sensor data, such as image data, radar data, LIDAR data and the like, and/or other data as would be understood by one of ordinary skill in the art. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

One or more regression models may be used. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing an agent to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The invention claimed is:

1. An apparatus configured to operate in an environment, the apparatus comprising:
an interface configured to receive sensor data; and
processing circuitry that is configured to:
localize an object based on the sensor data to determine localization data;
determine a priority list for scheduling processing of the localization data of the localized object based on the localization data and a priority policy, the priority list including a priority for processing the localization data of the object by the processing circuitry;
control the apparatus to implement a processing schedule for processing of the localization data of the object based on the priority list; and
receive updates to the priority policy from an external computing device, the priority policy being updated based on a local priority list for scheduling sensor data processing associated with one or more of a plurality of agents operating within the environment.

2. The apparatus of claim 1, wherein, to localize the object, the processing circuitry is configured to:
generate a point cloud of the object based on the sensor data;
determine a bounding box of the object based on the point cloud;
determine coordinates of the object based on the point cloud; and
determine a distance to the object based on the determined coordinates,
wherein the localization data is determined based on the bounding box, the coordinates, or the distance.

3. The apparatus of claim 2, wherein the processing circuitry is configured to determine three dimensions of the bounding box.

4. The apparatus of claim 2, wherein determining coordinates of the object comprises determining a centroid of the object.

5. The apparatus of claim 1, wherein the priority list associates the priority in which the localization data of the object is to be processed with the corresponding localization data of the object.

6. The apparatus of claim 1, wherein the localization data comprises coordinates of the object, a distance to the object, or a bounding box of the object.

7. The apparatus of claim 1, wherein the processing circuitry is further configured to process the sensor data for the localized object according to the processing schedule to classify the object.

8. The apparatus of claim 1, wherein the processing circuitry is further configured to provide the priority list to the external computing device and to further update the priority list based on a request received from the external computing device.

9. The apparatus of claim 1, wherein the processing circuitry is further configured to update the priority list based on external information received by the apparatus.

10. The apparatus of claim 9, wherein the external information comprises:
sensor data from one or more external sensors or data from another device sharing an environment of the apparatus.

11. The apparatus of claim 1, wherein the apparatus is a controller of an autonomous agent.

12. An apparatus configured to operate in an environment, the apparatus comprising:
processing circuitry configured to:
detect an object based on sensor data and to generate object information corresponding to the object; and
determine a priority list for scheduling processing of the object information of the detected object based on a priority policy and the object information, the priority list including a priority for processing the object information of the object by the processing circuitry,
wherein the apparatus is controlled to implement a processing schedule for processing of the object information of the object based on the priority list; and
receive updates to the priority policy from an external computing device, the priority policy being updated based on a local priority list for scheduling sensor data processing associated with one or more of a plurality of agents operating within the environment.

13. The apparatus of claim 12, wherein the processing circuitry is configured to:

generate a point cloud of the object based on the sensor data;

determine a bounding box of the object based on the point cloud;

determine coordinates of the object based on the point cloud, and determine a distance to the object based on the determined coordinates; and generate the object information based on the bounding box, the coordinates, or the distance.

14. The apparatus of claim 13, wherein the processing circuitry is configured to generate the object information based on the bounding box, the coordinates, and the distance.

15. The apparatus of claim 13, wherein the processing circuitry is configured to determine three dimensions of the bounding box.

16. The apparatus of claim 13, wherein the coordinates of the object comprise a centroid of the object.

17. The apparatus of claim 12, wherein the priority list associates the priority in which the object information of the object is to be processed with the corresponding object information of the object.

18. The apparatus of claim 12, wherein the object information comprises a bounding box of the object, coordinates of the object, or a distance from the apparatus to the object.

19. The apparatus of claim 12, wherein the processing circuitry is further configured to process the sensor data for the object according to the processing schedule to classify the object.

20. The apparatus of claim 12, wherein the processing circuitry is further configured to provide the priority list to the external computing device and to further update the priority list based on a request from the external computing device.

21. An apparatus configured to operate in an environment, the apparatus comprising:

interface means for receiving sensor data; and processing means for:

localizing an object based on the sensor data to determine localization data;

determining a priority list for scheduling processing of the localization data of the localized object based on the localization data and a priority policy, the priority list including a priority for processing the localization data of the object by the processing means;

controlling the apparatus to implement a processing schedule for processing of the localization data of the object based on the priority list; and receiving updates to the priority policy from an external computing device, the priority policy being updated based on a local priority list for scheduling sensor data processing associated with one or more of a plurality of agents operating within the environment.

22. The apparatus of claim 21, wherein, to localize the object, the processing means is configured to:

generate a point cloud of the object based on the sensor data;

determine a bounding box of the object based on the point cloud;

determine coordinates of the object based on the point cloud; and determine a distance to the object based on the determined coordinates, wherein the localization data is determined based on the bounding box, the coordinates, and/or the distance.

23. The apparatus of claim 21, wherein the priority list associates the priority in which the localization data of the object is to be processed with the corresponding localization data of the object.

24. A non-transitory computer-readable medium having instructions stored thereon that, when executed by processing circuitry of an apparatus configured to operate in an environment, cause the processing circuitry to:

localize an object based on sensor data to determine localization data;

determine a priority list for scheduling processing of the localization data of the localized object based on the localization data and a priority policy, the priority list including a priority for processing the localization data of the object;

control the apparatus to implement a processing schedule for processing of the localization data of the object based on the priority list; and receive updates to the priority policy from an external computing device, the priority policy being updated based on a local priority list for scheduling sensor data processing associated with one or more of a plurality of agents operating within the environment.

25. The non-transitory computer-readable storage medium of claim 24, wherein, localizing the object comprises:

generating a point cloud of the object based on the sensor data;

determining a bounding box of the object based on the point cloud;

determining coordinates of the object based on the point cloud; and determining a distance to the object based on the determined coordinates, wherein the localization data is determined based on the bounding box, the coordinates, or the distance.

* * * * *